United States Patent
O'Neill (10) Patent No.: US 7,637,141 B2
(45) Date of Patent: Dec. 29, 2009

(54) SELF-CALIBRATING BAROMETER

(75) Inventor: Terrence J. O'Neill, Lake Geneva, WI (US)

(73) Assignee: Quartex, division of Primex, Inc., Lake Geneva, WI (US)

(*) Notice: Subject to any disclaimer, the term of this patent is extended or adjusted under 35 U.S.C. 154(b) by 445 days.

(21) Appl. No.: 11/680,213

(22) Filed: Feb. 28, 2007

(65) Prior Publication Data

US 2008/0202234 A1    Aug. 28, 2008

(51) Int. Cl.
*G01L 27/00* (2006.01)
(52) U.S. Cl. .................................... 73/1.59
(58) Field of Classification Search .......... None
See application file for complete search history.

(56) References Cited

U.S. PATENT DOCUMENTS

| | | | |
|---|---|---|---|
| 4,969,358 A | 11/1990 | Peet, II | |
| 6,678,630 B1 * | 1/2004 | Joder et al. | 702/139 |
| 6,735,542 B1 | 5/2004 | Burgett et al. | |
| 2006/0000286 A1 | 1/2006 | Makela et al. | |
| 2006/0212257 A1 | 9/2006 | Makela et al. | |

OTHER PUBLICATIONS

Wikipedia, Barometer, http://en.wikipedia.org/wiki/Barometer, webpage visited Dec. 8, 2006.

* cited by examiner

*Primary Examiner*—Robert R Raevis
(74) *Attorney, Agent, or Firm*—Michael Best & Friedrich LLP (57) ABSTRACT

Methods and systems for adjusting a pressure value to account for an altitude-induced pressure effect. One method includes determining an average pressure value experienced at a first altitude, determining a ratio based on the average pressure value and a reference pressure value, determining a current pressure value experienced at the first altitude, and adjusting the current pressure value based on the ratio to obtain an altitude-adjusted pressure value.

21 Claims, 5 Drawing Sheets

SELF-CALIBRATING BAROMETER

BACKGROUND

1. Field

Embodiments of the invention relate generally to methods and systems for automatically adjusting an air pressure value (e.g., observed by a barometer or similar pressure sensing device) to account for an altitude-induced pressure effect.

2. Related Art

A primary purpose of a barometer is to predict future weather conditions based on barometric pressure and the rate of change of barometric pressure. Barometer pressure readings are air pressure readings that have been adjusted based on the altitude, temperature, etc. experienced by the barometer in order to provide an air pressure reading at sea level. For example, by adjusting the air pressure readings based on altitude, a barometer located at 2000 feet above sea level will provide the same barometer readings as a barometer located at sea level.

SUMMARY

Embodiments of the invention provide methods and systems for automatically adjusting an air pressure value to account for a location-induced pressure effect, such as an altitude-induced pressure effect. Embodiments herein are applicable to altitude and to other location-related parameters that also influence air pressure, such as longitude.

The methods and systems can be used to automatically calibrate a pressure sensing device (e.g., a barometer) when the pressure sensing device is moved to or placed in a particular location. One method includes separating barometric pressure readings into a variable pressure (i.e., weather-related) component and a constant pressure (i.e., altitude related) component and adjusting barometric pressure readings based on the constant pressure components. For example, one method can include continuously averaging readings observed by a pressure sensing device, comparing the average readings with a calibrated reference value, and adjusting the current readings of the pressure sensing device based on a ratio of the calibrated reference value and the average readings. Embodiments of the invention can generally eliminate the need to obtain (e.g., by a user or a positioning device, such as a Global Positioning System ("GPS") device) and enter the local altitude, latitude, or current barometric reading into a pressure sensing device in order to calibrate the device each time the pressure sensing device is moved or placed in a new location.

Embodiments of the invention provide methods of adjusting a pressure value to account for an altitude-induced pressure effect. One method includes determining an average pressure value experienced at a first altitude, determining a ratio based on the average pressure value and a reference pressure value, determining a current pressure value experienced at the first altitude, and adjusting the current pressure value based on the ratio to obtain an altitude-adjusted pressure value.

Additional embodiments of the invention provide systems for adjusting a pressure value to account for an altitude-induced pressure effect. One system includes a pressure sensing module for determining a plurality of past pressure values experienced at a first altitude and a current pressure value experienced at the first altitude, and a processor for determining an average pressure value based on the plurality of past pressure values, determining a ratio based on the average pressure value and a reference pressure value, and adjusting the current pressure value based on the ratio to obtain an altitude-adjusted pressure value.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should be noted that a plurality of hardware and software based devices, as well as a plurality of different structural components, may be utilized to implement embodiments of the invention. Furthermore, and as described in subsequent paragraphs, the specific configurations illustrated in the drawings are intended to exemplify embodiments of the invention, and other alternative configurations are possible.

Atmospheric air pressure at sea level is a measurement of the weight of a column of air pressing down on a unit area located at sea level, and a change in air pressure is the result of adding or subtracting material to or from the column of air. A change in the air pressure around the column of air changes the density of material contained in the column of air, and a change in the moisture content of the column of air changes the quantity of the material contained in the column of air. These two types of changes are the primary means by which material is added to or removed from the column of air and, therefore, are means by which barometric air pressure changes at sea level. For example, adding moisture to the column of air increases the weight of the column and results in an increase in air pressure. Similarly, removing moisture from the column of air decrease the weight of the column of air and results in a decrease in air pressure. It should be noted that although an increase in moisture actually reduces the density of air, it increases the amount of material in the column of air, which ultimately results in higher air pressure at the base of the column. Similarly, although cold air holds less moisture than warm air and is denser than warm air, cold air is often associated with low pressure because the quantity of cold air in the column (e.g., without the added moisture) weighs less and removes moisture from the surrounding area, which may create a vacuum that further lowers the density of the air.

Like air pressure at sea level, air pressure at a particular location is a measurement of the weight of a column of air pressing down at that particular location, and the same pressure at two different locations or altitudes effectively indicates that a column of air at each location has the same weight. The formula for determining air pressure at a particular altitude with respect to sea level (e.g., assuming dry air) is as follows:

$$P_h = (P_o) \times (e)^{-(mgh/kT)}$$

where "$P_h$" is the air pressure at an altitude "h," "$P_o$" is the air pressure at sea level, "m" is the effective mass of one molecule, "g" is gravity, "h" is height or altitude, "k" is Boltzman's constant, and "T" is the average absolute temperature of the atmosphere (e.g., air). In the above equation, "m," "g," and "k" are constants and can be replaced with one constant. For example, "m," "g," and "k" can be replaced with the constant "K," making the equation as follows:

$$P_h = (P_o) \times (e)^{-((h/T) \times K)}$$

As noted above, pressure sensing devices, such as barometers, can be used to predict future weather conditions based on barometric pressure readings and the rate of change of barometric pressure readings. A barometric pressure reading is an air pressure reading that has been adjusted based on the altitude at which the reading was taken in order to provide an air pressure reading at sea level. Air pressure decreases with an increase in altitude, and air pressure changes with atmospheric weather conditions. Therefore, if a pressure sensing device is maintained at one altitude, any variations in barometric pressure experienced by the pressure sensing device will be due to weather conditions, and the offset between the barometric pressure experienced by the pressure sensing device and the barometric pressure experienced at sea level will be due to the altitude of the pressure sensing device.

Pressure changes due to altitude, however, also affect the relative magnitude of the weather-induced pressure changes. In addition, other factors can influence air pressure readings experienced by a pressure sensing device, such as the rotation of the earth, the latitude of the pressure sensing device, the tidal effect of the sun and moon on the atmosphere, the composition of the air, the temperature of the air, mountain ranges, and weather direction. However, the relative effect of these factors on barometric pressure is small or negligible. For example, the effect of the tidal effect of the sun and moon on barometric pressure can be approximately +/−0.1 millibars, which can be negligible to the barometric pressure reading. Similarly, the effect of latitude on barometric pressure is virtually the same as the effect of altitude on barometric pressure, and, therefore, is adjusted by altitude adjustments made to a barometric pressure reading. There also is a slow change in air pressure at a particular altitude between seasons (e.g., summer and winter), which is virtually the same as the effect of altitude on barometric pressure, and, therefore, is also accounted for by altitude adjustments made to a barometric pressure reading.

As described above, air pressure readings are a composite of pressure changes due to weather and pressure changes due to altitude. Therefore, to adjust a pressure reading to account for altitude-induced pressure effects, air pressure effects due to weather can be separated from pressure effects due to altitude. Recognizing that air pressure due to weather is dynamic and air pressure due to altitude or location is static when a pressure sensing device is maintained at a constant altitude, there are several ways to analyze air pressure data in order to determine or separate the variable pressure (i.e., weather-related) component from the constant pressure (i.e., altitude-related) component. For example, as described below, under static conditions (e.g., static weather conditions and other atmospheric conditions that affect air pressure), air pressure readings observed by a pressure sensing device change with altitude, and such changes are directly related to the altitude of the pressure sensing device. Therefore, the effect of altitude on pressure readings observed by a pressure sensing device can be determined by measuring the average air pressure reading observed by a pressure sensing device in a particular location and comparing the average air pressure reading to a theoretical reference reading at a fixed location, such as the average pressure reading at sea level (101,325 pascals, 29.921 inches Hg).

For example, as previously noted, a formula for determining air pressure at a particular altitude with respect to sea level is as follows:

$$P_h = (P_o) \times (e)^{-((h/T) \times K)}$$

where "$P_o$" is the air pressure experienced at sea level, and $(e)^{-((h/T) \times K)}$ is the "altitude factor" applied to the air pressure experienced at sea level in order to obtain the air pressure experienced at the altitude "h".

Figure 3:
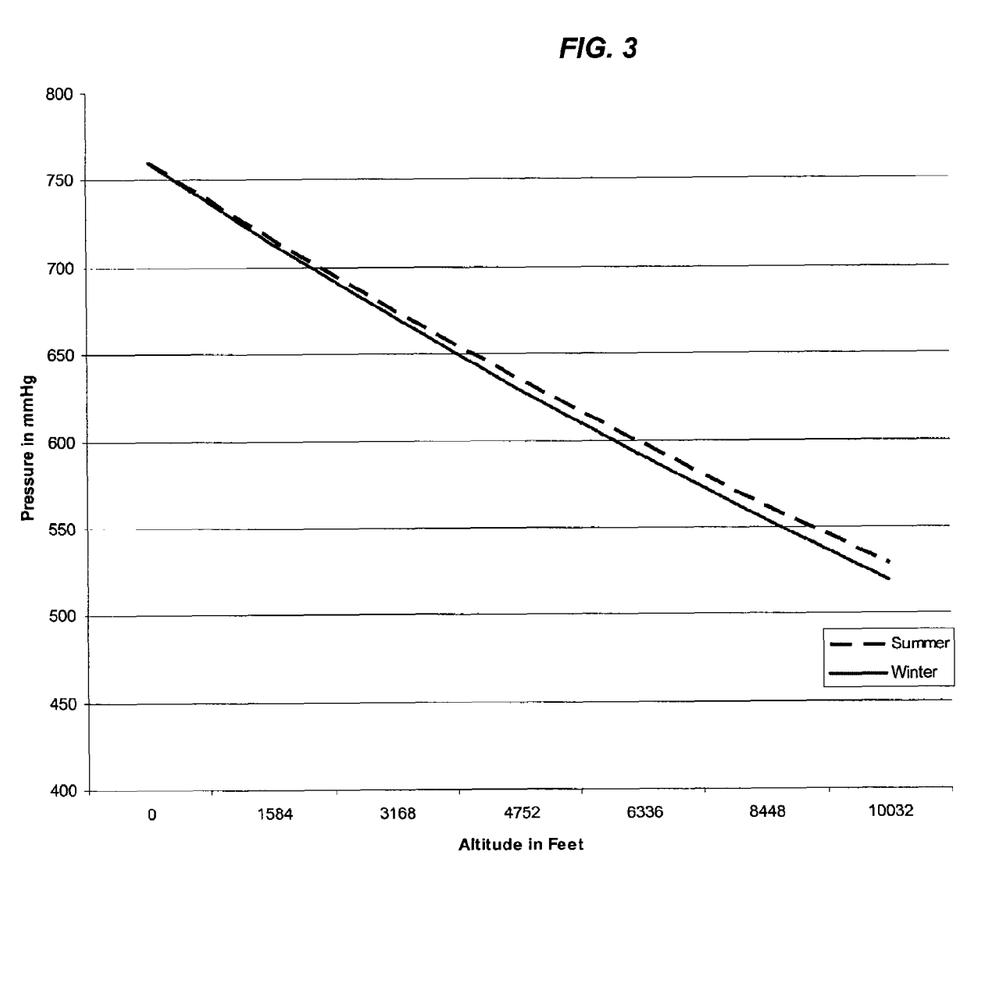
FIG. 3 is a graph illustrating the effects of atmospheric temperature on air pressure at various altitudes.

The height or altitude ("h") of a pressure sensing device while in a fixed location is constant (e.g., the pressure sensing device is placed and used in one location). This leaves atmospheric temperature ("T") as a variable in the aforementioned altitude factor. Atmospheric temperature by itself does not change the amount of material in a column of air at sea level (760 mmHg). Therefore, as shown in FIG. 3, the average pressure at sea level (i.e., altitude=0 feet) does not change between summer and winter (e.g., does not change with respect to atmospheric temperature), but atmospheric temperature can have a small effect on altitudes above sea level. This change in pressure due to temperature is relatively small and occurs slowly. Therefore, for short periods of time (e.g., a couple of days, weeks, or months), the temperature value ("T") used in the above equation can be considered constant. Furthermore, when using a rolling average pressure in calculations, the rolling average pressure adjusts for slow changes in pressure due to temperature as though they were small changes in altitude.

If the atmospheric temperature ("T") and the altitude ("h") experienced by a pressure sensing device at a particular location are generally constant, the ratio between "$P_h$" and "$P_o$" can generally also be viewed as a constant. Therefore, although the ratio between "$P_h$" and "$P_o$" often is not actually a constant, the ratio moves generally slowly enough that it can be tracked and followed by monitoring the average pressure reading at a fixed altitude and comparing that value to the average pressure at sea level reference. In some embodiments, the average pressure reading of a pressure sensing device can be a rolling average (e.g., the last x number of readings) so that the average tracks slow seasonal temperature changes while being virtually constant when viewed in light of the more rapidly moving weather conditions.

Therefore, for calculation purposes, the ratio between "$P_h$" and "$P_o$" can be viewed as a constant, which is equal to the altitude factor included in the original air pressure equation described above:

$$(P_h)/(P_o)=(e)^{-(mgh/kT)}$$

Furthermore, by replacing the air pressure at the height "h" ("$P_h$") with the average pressure experienced by a pressure sensing device ("$P_a$") and using a reference pressure value ("$P_r$"), such as an average sea level pressure value (e.g., 101,325 pascals, 29.91 inches Hg), as the sea level pressure value ("$P_o$"), the equation can be rewritten as follows:

$$(P_a)/(P_r)=(e)^{-(mgh/kT)}$$

This relationship can be substituted into the previous equation to replace the altitude factor ("$(e)^{-(mgh/kT)}$"), which yields the following equation:

$$P_h=(P_o) \times (P_a)/(P_r)$$

This equation can be rewritten in order to obtain the following relationship:

$$P_o=(P_h) \times (P_r)/(P_a)$$

This equation can be used to adjust an air pressure value ("$P_h$") experienced by a pressure sensing device to account for the altitude of the pressure sensing device based on an average air pressure value experienced by the pressure sensing device ("$P_a$") and a reference pressure value ("$P_r$").

Figure 1:
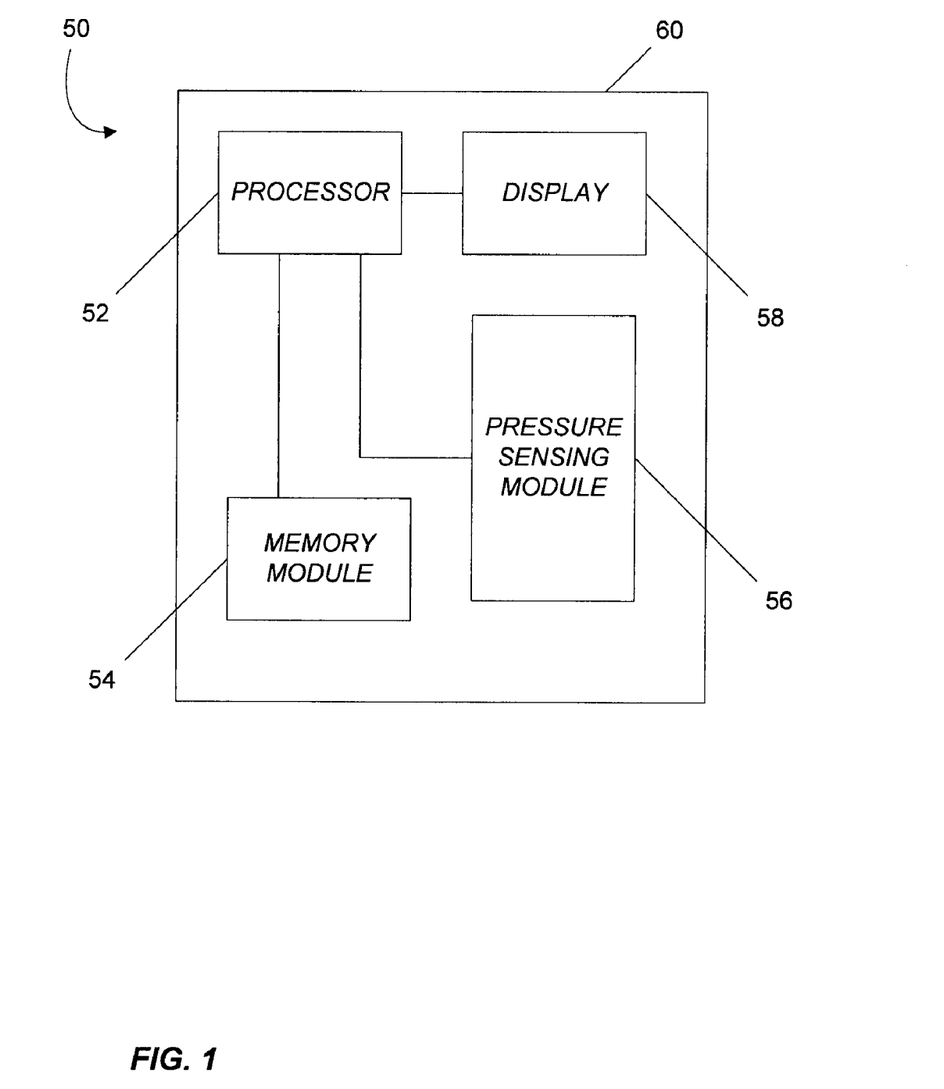
FIG. 1 schematically illustrates a system for adjusting an air pressure value to account for altitude-induced pressure effects according to one embodiment of the invention.

FIG. 1 schematically illustrates a system 50 for adjusting an air pressure to account for altitude-induced pressure effects according to one embodiment of the invention. In some embodiments, the system 50 can be a pressure sensing device, such as a barometer. In other embodiments, the system 50 can include a pressure sensing device, such as an altimeter. As shown in FIG. 1, the system 50 includes a processor 52, a memory module or device 54, a pressure sensing module 56, and a display 58. It should be understood that the pressure sensing module 56 can include any pressure sensing device (e.g., mechanical or electronic) whose readings can be input into or read by the processor 52. For example, the pressure sensing module 56 can include a water-based pressure sensing device, a mercury-based pressure sensing device, an aneroid pressure sensing device, and/or a similar pressure sensing device. As shown in FIG. 1, the processor 52, the memory module 54, the pressure sensing module 56, and the display 58 can be enclosed in a housing 60. The housing 60 can include an opening or air passageway that exposes at least a portion of the pressure sensing module 56 to atmospheric conditions. For example, if the pressure sensing module 56 includes a mercury-based pressure reading device, the pressure sensing module 56 can include a column with a mercury-filled reservoir at the base that is open or exposed through the housing 60.

Components of the system 50 can also be distributed throughout one or more separate devices. For example, the pressure sensing module 56 can be located in a device (e.g., a housing) separate from the processor 52 and can be connected to the processor 52 via one or more wired or wireless connections. In some embodiments, the processor 52 can be a part of a general purpose computing device (e.g., a personal computer) and can receive air pressure readings from the pressure sensing module 56 over a direct wired or wireless connection or an indirect wired or wireless connection (e.g., through one or more networks).

In some embodiments, the processor 52 obtains the air pressure readings directly from the pressure sensing module 56. In other embodiments, the pressure sensing module 56 stores readings to the memory module 54, and the processor 52 obtains the readings from the memory module 54. It should be understood that the memory module 54, or a portion thereof, can be contained within the processor 52.

After the processor 52 obtains air pressure readings from the pressure sensing module 56, the processor 52 processes the readings. For example, as described below, the processor 52 can adjust the pressure readings observed by the pressure sensing module 56 to account for the altitude of the pressure sensing module 56. In some embodiments, the memory module 54 stores instructions or programs and/or data accessed and used by the processor 52 to process the readings. In other embodiments, the processor 52 can be preprogrammed with instructions and/or data for processing the readings.

After processing the readings, the processor 52 can output the readings to the display 58 and/or other suitable output device(s). The display 58 can include a liquid crystal display, one or more light emitting diodes, or any other type of display capable of displaying information to a user. In some embodiments, the processor 52 can also output the readings (e.g., in processed form or in raw form) to the memory module 54 for storage. In some embodiments, the display 58 and/or the memory module 54 can be contained in a device separate from the processor 52 and can be connected to the processor 52 via one or more wired or wireless connections.

Figure 2:
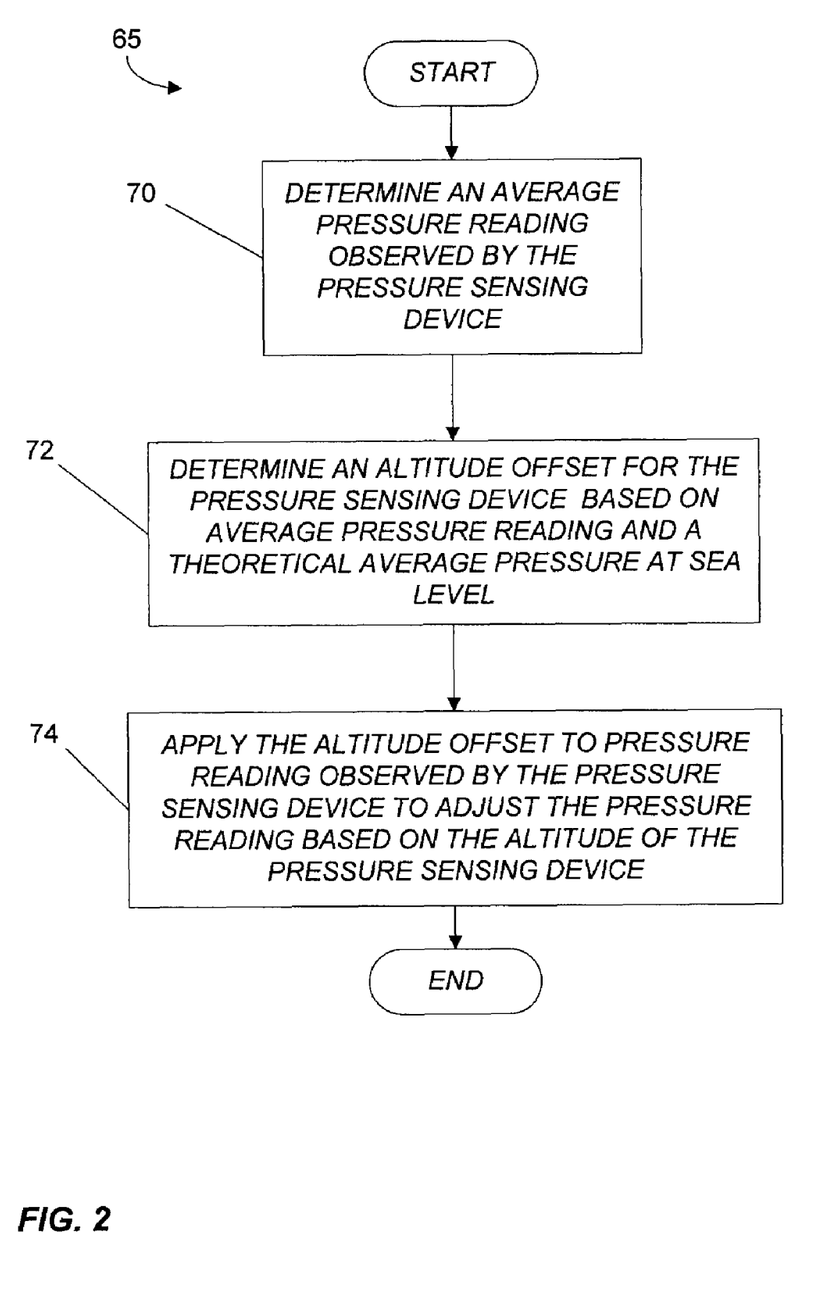
FIG. 2 illustrates a method of adjusting an air pressure value to account for altitude-induced pressure effects according to one embodiment of the invention.

FIG. 2 illustrates a method 65 of determining the effect of altitude on pressure readings according to one embodiment of the invention. The processor 52 shown in FIG. 1 can perform the method shown in FIG. 2 in order to process readings obtained from the pressure sensing module 56. For example, Table 1 below includes example data observed by the pressure sensing device of FIG. 1 located at 1000 feet above sea level over a time period of one day.

TABLE 1

| Hour | Observed Pressure Reading (millibars) (unadjusted) | Average Observed Pressure Reading (millibars) (Rolling Average) | Reference Pressure Value (millibars) (Theoretical Average at Sea Level) | Adjusted Pressure Reading (millibars) |
|---|---|---|---|---|
| 0:00 | 887.8 | 887.8 | 1,013 | 1,013.000 |
| 1:00 | 887.9 | 887.9 | 1,013 | 1,013.057 |
| 2:00 | 888.1 | 887.9 | 1,013 | 1,013.190 |
| 3:00 | 888.5 | 888.1 | 1,013 | 1,013.485 |
| 4:00 | 888.5 | 888.2 | 1,013 | 1,013.388 |
| 5:00 | 888.5 | 888.2 | 1,013 | 1,013.323 |
| 6:00 | 888.7 | 888.3 | 1,013 | 1,013.472 |
| 7:00 | 888.5 | 888.3 | 1,013 | 1,013.214 |
| 8:00 | 888.9 | 888.4 | 1,013 | 1,013.900 |
| 9:00 | 889.8 | 888.6 | 1,013 | 1,014.425 |
| 10:00 | 890.4 | 888.7 | 1,013 | 1,014.917 |
| 11:00 | 890.5 | 888.9 | 1,013 | 1,014.861 |
| 12:00 | 890.4 | 889.0 | 1,013 | 1,014.613 |
| 13:00 | 890.6 | 889.1 | 1,013 | 1,014.709 |
| 14:00 | 890.9 | 889.2 | 1,013 | 1,014.914 |
| 15:00 | 891.3 | 889.4 | 1,013 | 1,015.221 |
| 16:00 | 891.5 | 889.5 | 1,013 | 1,015.305 |
| 17:00 | 892.1 | 889.6 | 1,013 | 1,015.821 |
| 18:00 | 892.5 | 889.8 | 1,013 | 1,016.104 |
| 19:00 | 892.6 | 889.9 | 1,013 | 1,016.056 |
| 20:00 | 892.5 | 890.0 | 1,013 | 1,015.802 |
| 21:00 | 892.5 | 890.2 | 1,013 | 1,015.674 |
| 22:00 | 892.7 | 890.3 | 1,013 | 1,015.775 |
| 23:00 | 892.4 | 890.4 | 1,013 | 1,015.332 |

As shown in FIG. 2, a first step of the method includes determining an average air pressure reading taken by a pressure sensing device (e.g., the pressure sensing module 56 of FIG. 1) (step 70). An average air pressure reading is determined based on the pressure readings observed by a pressure sensing device over a period of time (e.g., a couple of weeks, a couple of months, etc.). This period of time can be referred to as the "learning period," and, in some embodiments, as shown in Table 1, can include a rolling average. It should be understood that other mathematical functions can be used in place of, or in addition to, averaging the air pressure readings taken by a pressure sensing device. For example, the mean, medium, or mode of air pressure readings taken by a pressure sensing device can be determined and used to provide similar results.

Figure 4:
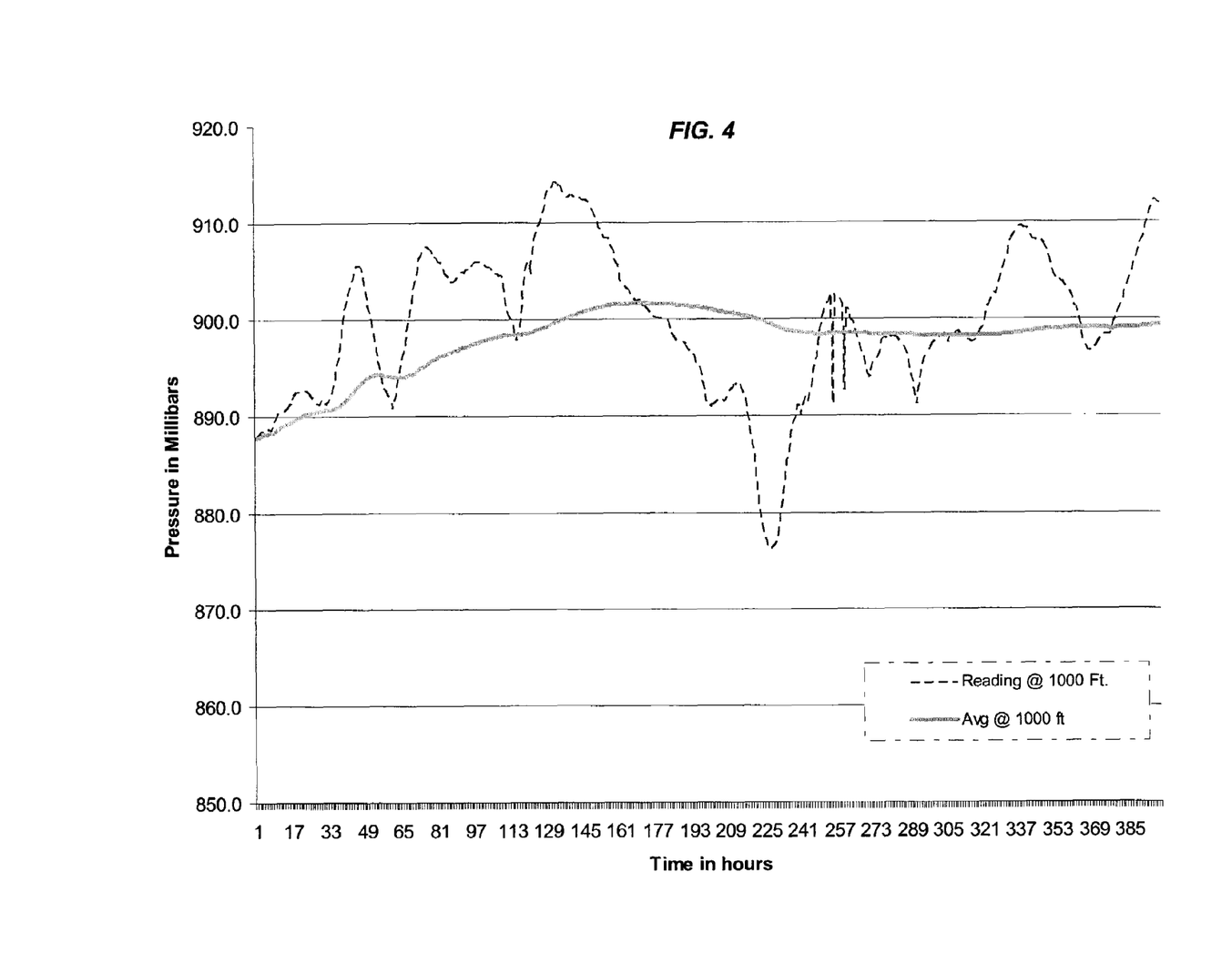
FIG. 4 is a graph illustrating observed pressure values and average pressure values observed by a pressure sensing device over a period of time.

After determining an average pressure reading observed by the pressure sensing device, an altitude-induced offset ("altitude offset") can be determined by comparing the average air pressure reading to a reference value. As shown in Table 1, the reference value can include a theoretical average pressure at sea level (e.g., 1,013 millibars) (step 72). As described above, the ratio between the average air pressure reading and the theoretical average sea level air pressure reading can be used to determine an appropriate adjustment or offset for the current reading observed by the pressure sensing device based on the altitude of the pressure sensing device. FIG. 4 is a graph of air pressure readings observed by a pressure sensing device over a period of approximately 19 days and average pressure values (e.g., rolling average pressure values) determined by the pressure sensing device over the same time period.

In some embodiments, the pressure sensing device (e.g., a processor or a circuit included in or connected to the pressure sensing device) can use an equation to determine an adjustment factor for the pressure sensing device, and, although equations that relate pressure and altitude are not generally linear, the difference between the actual average air pressure reading and the theoretical average air pressure reading at sea level can describe an offset or adjustment factor for the pressure sensing device. For example, as described above, a ratio of the actual average air pressure reading and a theoretical average air pressure reading can provide a reasonable estimate of the effect due to altitude on pressure observed by a pressure sensing device.

As shown in FIG. 2 and Table 1, after determining the altitude offset, the altitude offset can be applied to a pressure reading observed by the pressure sensing device (step 74). For example, the processor 52 can use the formula described above to determine a pressure reading that is adjusted to account for the altitude of the pressure sensing device:

$$P_o = (P_h) \times (P_r)/(P_a)$$

where "$P_o$" is the barometric pressure reading that is adjusted to account for the altitude of the pressure sensing device, "$P_h$" is the actual barometric pressure reading observed by the pressure sensing device (unadjusted for the altitude of the pressure sensing device), "$P_r$" is a reference pressure value (e.g., 1,013 millibars), and "$P_a$" is an average pressure reading observed by the pressure sensing device (unadjusted for the altitude of the pressure sensing device).

Figure 5:
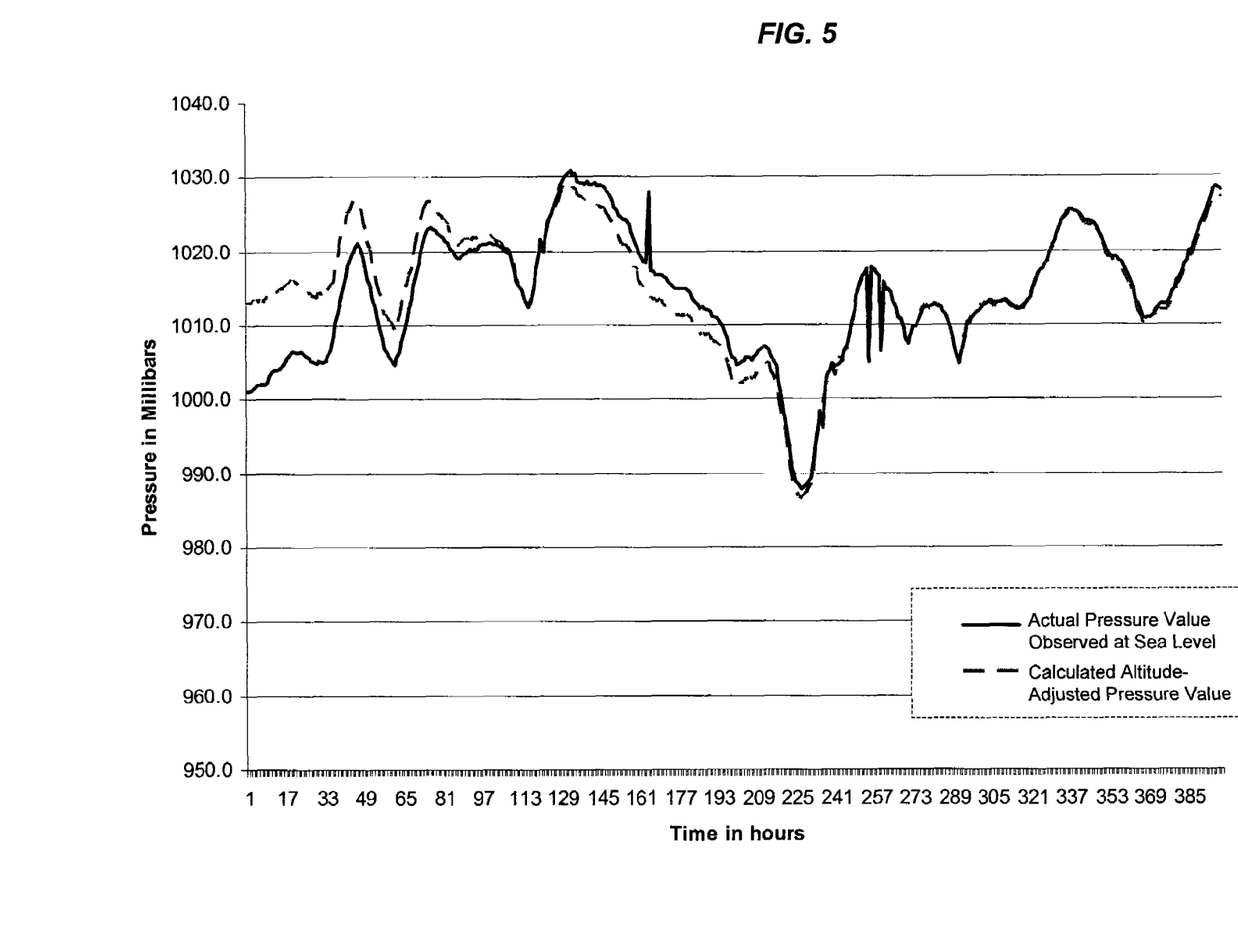
FIG. 5 is a graph illustrating pressure readings adjusted to account for altitude-induced pressure effects and actual pressure readings observed at sea level over a period of time.

It should be understood that, in some embodiments, the more pressure readings observed by a pressure sensing device, the more accurate are the calculations performed by the pressure sensing device. For example, FIG. 5 is a graph illustrating adjusted pressure readings determined by a pressure sensing device over a period of approximately 19 days. The graph also illustrates actual pressure readings observed at sea level during the same time period. As shown in the graph, as time passes, the adjusted pressure readings become increasingly generally aligned with the actual pressure readings observed at sea level over the time period.

Using the above equation or similar equations that separate the static (e.g., altitude-induced) pressure changes from the dynamic (e.g., weather-induced) pressure changes, a pressure sensing device can adjust to account for static air pressure changes automatically each time the pressure sensing device is placed in a new location without requiring any information from a user and without requiring costly positioning devices.

Systems, devices, and methods described herein can be used in various settings. For example, a pressure sensing device can be used in a scientific setting, a home setting, or an outdoor setting (e.g., hiking, mountain climbing, etc.). As such, pressure sensing devices can include various types and/or combinations of power sources. For example, a pressure sensing device used in a scientific setting or a home setting can be AC powered and may have a backup battery power source. Similarly, a pressure sensing device used in an outdoor setting can be battery powered and/or solar powered.

Pressure sensing devices can also be combined or incorporated with other devices and/or systems. For example, a pressure sensing device can be included as part of a weather station, a radio, a navigation system, a positioning system or device, etc. In some embodiments, a pressure sensing device can also be used as an altitude-determining device. For example, after a device uses the above self-calibration method to determine an altitude-adjusted pressure value, the device can use the ratio (i.e., the altitude-adjusted pressure value and the observed pressure reading) and the equation for determining air pressure at a particular altitude with respect to sea level (e.g., $P_h = (P_o) \times (e)^{-(mgh/kT)}$) to estimate the altitude ("h") of the pressure sensing device.

In some embodiments, pressure sensing devices can also include a user interface that allows a manufacturer and/or a user to specify (e.g., configure) one or more operating parameters of the pressure sensing device, such as the frequency at which the device takes pressure readings, the number of observed pressure readings to include in the rolling average, the reference pressure value, etc. For example, a pressure sensing device can include one or more input mechanisms (e.g., a touch screen; a keypad; a keyboard; one or more switches, buttons, and/or actuators; etc.) for specifying operating parameters of the pressure sensing device. In some embodiments, a manufacturer and/or user can also use a remote user interface to specify operating parameters for a pressure sensing device. For example, a user can use a personal computer connected to one or more pressure sensing devices (e.g., directly or indirectly over one or more computer networks, such as the Internet) to specify settings for the one or more pressure sensing devices. The remote user interface can include a web page that a manufacturer and/or a user can access using a browser application executed by a computing device. In this way, no special-purpose software and/or hardware is needed to remotely program a pressure sensing device. In some embodiments, a user can also use the remote user interface to view pressure readings, values, and other information obtained by one or more pressure sensing devices.

A pressure sensing device can also be connected to or in communication with one or more external processors and/or data storage devices. For example, a pressure sensing device can transmit observed pressure readings and/or calculated altitude-adjusted pressure values to an external processor or an external data storage device for archival and/or additional processing. For example, observed pressure readings and calculated altitude-adjusted pressure values obtained by multiple pressure sensing devices located in a particular area can be consolidated and processed by an external processor in order to provide a more accurate barometric pressure value for the area. A pressure sensing device can also send additional information, such as status information, to an external processor and/or an external data storage device.

In some implementations, embodiments of the above self-calibration method can be used as a backup pressure-adjusting method for a pressure sensing device. For example, a pressure sensing device can include a GPS receiver that allows the device to determine its altitude and, therefore, adjust pressure readings observed by the device based on its altitude. If the GPS receiver fails or malfunctions, however, the device can use the above self-calibration method to provide altitude-adjusted pressure values. Similarly, a pressure sensing device can be configured to receive an altitude value or an offset value from a user or another source that the device uses to adjust a pressure reading observed by the device. If, however, the altitude value or the offset value has not been provided or is unavailable, the device can use the above self-calibration method to provide altitude-adjusted pressure values. In some embodiments, the pressure sensing device can generate and send a message to an external device or system when the back-up self-calibration method is being used. The message can indicate that the primary pressure-adjusting method employed by the device is malfunctioning or cannot be used. Receipt of the message at the external device or system can cause various actions. For example, the message can alert a technician to repair the device or can cause programming settings to be transmitted to the device. The pressure sensing device can also include or provide one or more indicators, such as a light emitting diode, an icon displayed on the display of the device, a sound, etc., that alerts a user when the device is operating using the self-calibration method.

Various features and advantages of the invention are set forth in the following claims.

What is claimed is:

1. A method of adjusting a pressure value of a pressure sensing device to account for an altitude-induced pressure effect, the pressure sensing device including a pressure sensing module and a processor, the method comprising:
   determining, by the processor, an average pressure value experienced at an altitude, the altitude being unknown to the pressure sensing device, the pressure sensing module, and the processor;
   determining, by the processor, a ratio based on the average pressure value and a fixed reference pressure value;
   determining, by the pressure sensing module, a current pressure value experienced at the altitude; and
   adjusting, by the processor, the current pressure value based on the ratio and independent of the altitude to obtain an altitude-adjusted pressure value.

2. The method of claim 1, wherein the average pressure value is a rolling average pressure value.

3. The method of claim 1, wherein the average pressure value is determined over a period of time including at least a plurality of days.

4. The method of claim 1, wherein the fixed reference pressure value is a theoretical average pressure value experienced at sea level.

5. The method of claim 1, wherein adjusting the current pressure value includes multiplying the current pressure value by the ratio.

6. The method of claim 1, wherein the altitude-adjusted pressure value is a barometric pressure value.

7. The method of claim 1, further comprising estimating the altitude based on the ratio.

8. A system for adjusting a pressure value to account for an altitude-induced pressure effect, the system comprising:
   a pressure sensing module for determining a plurality of past pressure values experienced at an altitude and a current pressure value experienced at the altitude; and
   a processor for determining an average pressure value based on the plurality of past pressure values, determining a ratio based on the average pressure value and a fixed reference pressure value, and adjusting the current pressure value based on the ratio and independent of the altitude to obtain an altitude-adjusted pressure value,
   wherein the altitude is unknown to the system, the pressure sensing module, and the processor.

9. The system of claim 8, wherein the pressure sensing module includes at least one of a water-based pressure sensing device, a mercury-based pressure sensing device, an aneroid pressure sensing device, and an electronic sensing device.

10. The system of claim 8, further comprising a housing, wherein the pressure sensing module and the processor are positioned within the housing.

11. The system of claim 8, further comprising a memory module for storing the plurality of past pressure values.

12. The system of claim 11, wherein the memory module stores the ratio.

13. The system of claim 11, wherein the memory module stores the altitude-adjusted pressure value.

14. The system of claim 8, wherein the average pressure value is a rolling average of the plurality of past pressure values.

15. The system of claim 8, wherein the average pressure value is determined over a period of time including at least a plurality of days.

16. The system of claim 8, wherein the fixed reference pressure value is a theoretical average pressure value experienced at sea level.

17. The system of claim 8, wherein the processor adjusts the current pressure value by multiplying the current pressure value by the ratio.

18. The system of claim 8, further comprising at least one display for displaying the altitude-adjusted pressure value.

19. The system of claim 8, wherein the altitude-adjusted pressure value is a barometric pressure value.

20. A computer-readable medium in a pressure sensing device including a pressure sensing module and a processor, the computer-readable medium encoded with a plurality of processor-executable instructions for adjusting a pressure value to account for an altitude-induced pressure effect, the instructions comprising:
   determining, by the processor, an average pressure value experienced at an altitude, the altitude being unknown to the pressure sensing device, the pressure sensing module, and the processor;
   determining, by the processor, a ratio based on the average pressure value and a fixed reference pressure value;
   determining, by the pressure sensing module, a current pressure value experienced at the altitude; and
   adjusting, by the processor, the current pressure value based on the ratio and independent of the altitude to obtain an altitude-adjusted pressure value.

21. The computer-readable medium of claim 20, wherein the average pressure value is a rolling average pressure value.

* * * * *